United States Patent
Solomon et al.

(10) Patent No.: US 7,568,059 B2
(45) Date of Patent: Jul. 28, 2009

(54) LOW-POWER RECONFIGURABLE ARCHITECTURE FOR SIMULTANEOUS IMPLEMENTATION OF DISTINCT COMMUNICATION STANDARDS

(75) Inventors: Doron Solomon, Holon (IL); Gilad Garon, Jerusalem (IL)

(73) Assignee: ASOCS Ltd., Rosh Haayin (IL)

( * ) Notice: Subject to any disclaimer, the term of this patent is extended or adjusted under 35 U.S.C. 154(b) by 0 days.

(21) Appl. No.: 11/071,340

(22) Filed: Mar. 3, 2005

(65) Prior Publication Data

US 2006/0010272 A1    Jan. 12, 2006

Related U.S. Application Data (60) Provisional application No. 60/586,390, filed on Jul. 8, 2004, provisional application No. 60/586,391, filed on Jul. 8, 2004, provisional application No. 60/586,389, filed on Jul. 8, 2004, provisional application No. 60/586,353, filed on Jul. 8, 2004.

(51) Int. Cl.
*G06F 13/42*   (2006.01)
*G06F 13/00*   (2006.01)

(52) U.S. Cl. ............... 710/105; 710/10; 710/11; 710/104

(58) Field of Classification Search ........... 710/10, 710/11, 104, 105
See application file for complete search history.

(56) References Cited

U.S. PATENT DOCUMENTS

| 5,574,722 | A | * | 11/1996 | Slykhouse et al. ........... 370/257 |
| 6,401,230 | B1 | | 6/2002 | Ahanessians et al. |
| 6,721,581 | B1 | * | 4/2004 | Subramanian ........... 455/575.1 |
| 2003/0101363 | A1 | * | 5/2003 | Master ...................... 713/324 |
| 2003/0154357 | A1 | * | 8/2003 | Master et al. ................. 712/15 |
| 2003/0172364 | A1 | * | 9/2003 | Lin ............................. 716/17 |
| 2004/0078403 | A1 | * | 4/2004 | Scheuermann et al. ...... 708/322 |
| 2004/0103265 | A1 | * | 5/2004 | Smith .......................... 712/15 |
| 2006/0105802 | A1 | * | 5/2006 | Heo et al. ................ 455/550.1 |

* cited by examiner

*Primary Examiner*—Khanh Dang
*Assistant Examiner*—Nimesh G Patel
(74) *Attorney, Agent, or Firm*—McDermott Will & Emery LLP (57) ABSTRACT

A chip architecture for use in processing signals encoded in accordance with any one of a plurality of communication protocols each defined by a series of algorithms is disclosed. The chip architecture comprises a plurality of megafunctions, each in the form of reusable, reconfigurable functional blocks for use in implementing different algorithms necessary for implementing the physical layer of each of the communication protocols; and a plurality of switches configured to respond to select control signals so as to interconnect the necessary megafunctions for processing the signals encoded with each of the protocols. Preferably, at least some of the same megafunctions are used with algorithms of two or more protocols.

45 Claims, 3 Drawing Sheets

LOW-POWER RECONFIGURABLE ARCHITECTURE FOR SIMULTANEOUS IMPLEMENTATION OF DISTINCT COMMUNICATION STANDARDS

RELATED APPLICATIONS

The present application claims priority from U.S. Provisional Applications, Ser. Nos.:

60/586,390, filed Jul. 8, 2004 and entitled Low-Power Reconfigurable Architecture for Simultaneous Implementation of Distinct Communication Standards;

60/586,391, filed Jul. 8, 2004 and entitled Method and Architecture for Implementation of Reconfigurable Matrix-Vector Computations;

60/586,389, filed Jul. 8, 2004 and entitled Method and Architecture for Implementation of Reconfigurable Orthogonal Transformations;and 60/586,353, filed Jul. 8, 2004 and entitled Method and Architecture for Implementation of Reconfigurable Trellis-Type Coding.

FIELD OF THE DISCLOSURE

The disclosure generally relates to an architecture for implementing different communication protocols or standards using unique adaptable and reconfigurable hardware, and more particularly to low-power, reconfigurable hardware, having a favorable foot print for portable applications and flexible so as to instantaneously adapt to processing signals transmitted using different communication protocols or standards so as to have a more universal application.

BACKGROUND OF THE DISCLOSURE

Reducing power dissipation is a key design goal for portable computing and communication devices that employ increasingly sophisticated and power-consuming signal processing techniques. Flexibility is another critical requirement that mandates the use of programmable components. However, there is a fundamental trade-off between efficiency and flexibility, and as a result, programmable designs incur significant performance and power penalties compared to application-specific integrated circuits (ASICs).

As the communications market continues its growth and rapid rate of change, equipment vendors struggle with the conflicting goals of performance, flexibility, cost and fast time-to-market. Traditional processing approaches such as digital signal processors (DSPs), ASICs, application-specific standard products (ASSPs) and field-programmable gate arrays (FPGAs) all force the designer to trade off between these key parameters. Thus, a new class of processor that enable designers to meet all these goals simultaneously is needed.

Future networked embedded devices, whether wired or wireless, will need to support multiple standards and protocols of communications and digital signal processing. This is due to convergence of voice, data and video, changing standards, and a high demand for evolving features. Equipment vendors are required to build systems that are more flexible and field upgradeable. For example, there is a strong demand for multi-protocol systems that can adapt to changing traffic patterns or support multiple markets. U.S. wireless infrastructure for example, must handle CDMA-One and TDMA digital traffic as well as the CDMA2000 standard. Since no one can accurately predict the volume of traffic of each type over the next few years, nor the final communication standard definitions, vendors strive to create flexible systems that can instantaneously adapt to changing patterns. Flexibility also allows vendors to differentiate their products and create higher value using proprietary algorithms. Reconfigurable systems have recently emerged as a promising implementation platform for such embedded computing by exhibiting both high performance [see, for example, G. R. Goslin, "A Guide to Using Field Programmable Gate Arrays for Application Specific Digital Signal Processing Performance", Proceedings of SPIE, vol. 2914, p321-331], and low power consumption [see, for example, A. Abnous et al, "Evaluation of a Low-Power Reconfigurable DSP Architecture", *Proceedings of the Reconfigurable Architecture Workshop*, Orlando, Fla., USA, March 1998, and M. Goel and N. R. Shanbhag, "Low-Power Reconfigurable Signal Processing via Dynamic Algorithm Transformations (DAT)", *Proceedings of Asilomar Conference on Signals, Systems and Computers*, Pacific Grove, Calif., November, 1998] frequently required by such system-on-a-chip designs. The current trend of reconfigurable architectures in both general purpose computing and embedded digital signal processing is to combine a programmable processor with reconfigurable computing components of different granularities (fine-grain [Digital Semiconductor, Digital Semiconductor SA-110 Microprocessor Technical Reference Manual, Digital Equipment Corporation, 1996, and TMS320C5x General-Purpose Applications User's Guide, Literature Number SPRU164, Texas Instruments, 1997], data-path [T. Anderson, The TMS320C2xx Sum-of-Products Methodology, Technical Application Re-port SPRA068, Texas Instruments, 1996] and mixed [T. Garverick et al, NAPA1000, http://www.national.com/appinfo/milaero/napa1000]). The problem of interface generation between hardware and software has recently gained attention by the VLSI CAD community. The problem of integrating processors with reconfigurable elements has added another dimension to the interface generation problem—between software and configware (configurable hardware). Careful configuration and interface code generation is essential [R. Razdan, K. Brace, M. D Smith, "PRISC software acceleration techniques", *Proceedings 1994 IEEE International Conference on Computer Design: VLSI in Computers and Processors*, Cambridge, Mass., USA, October 1994] to ensure that the overhead of reconfiguring will not offset the speed and energy savings of reconfigurable components. This need is especially pronounced when the reconfiguration frequency is large within an application and when the timing constraints on the application are tight—which is often the case for real-time DSP and communication applications.

SUMMARY OF THE INVENTION

A chip architecture is described for use in processing signals encoded in accordance with any one of a plurality of communication protocols each defined by a series of algorithms. The chip architecture comprises a plurality of megafunctions, each in the form of reusable, reconfigurable functional blocks for use in implementing different algorithms necessary for implementing the physical layer of each of the communication protocols. A plurality of switches are configured to respond to select control signals so as to interconnect the necessary megafunctions for processing the signals encoded with each of the protocols. Preferably, at least some of the same megafunctions are used with algorithms of two or more protocols.

In one embodiment at least some of the megafunctions are parameterized, and the parameters of at least some of the megafunctions being adapted to be dynamically changed depending on the communication protocol. In another embodiment, the size of at least some of the buses are adapted to be dynamically changed depending on the communication protocol.

The control signals for changing parameters of the parameterized megafunctions, as well as a set of signals for reconfiguring the megafunctions as well as the interconnections are preferably stored in memory, or can be inserted on-line from outside the chip architecture through and input/out block. The chip also includes an analyzer preferably made a part of the information stored in and run on CPU is configured so as to determine the protocol of the signal processed by the chip architecture, and apply the necessary control signals so as to configure the switches and interconnect the necessary megafunctions for processing the signals according to the determined protocols. The analyzer can be, for example, an algorithm performed by the CPU of the system architecture, an algorithm for checking the strength of the signals processed by the chip architecture, or simply responsive to the user input to the system architecture. The chip architecture thus includes some type of control for sensing the protocol of the signal, and operating the switches and configuring the megafunctions accordingly. The protocol used to process the signal can also be determined by a hand-off protocol between communication standards.

At least one protocol can implement the same algorithm at different stages of the protocol, as a function of a change in the receipt/transmission conditions with the megafunctions being configured accordingly. At least one protocol can also implement the same algorithm at different megafunctions of the same stage of the protocol as a function of a change in the receipt/transmission conditions. One or more of the megafunctions can be configured to implement any number of algorithms including: orthogonal transforms of the signals, such as cosine and sine transforms, Hilbert transforms and/or Walsh functions; algorithms involving Fourier transforms and/or Walsh-Hadamard transforms; those that perform processing of trellises defining the signals; algorithms that search for the minimum/maximum weight path, the BCJR algorithm for calculation of a MAP, and/or a belief propagation algorithm; and/or those that implement matrix-vector operations, including those which use finite and/or infinite fields and additional operations supported by the matrix-vector operations including polynomial convolutions, vector coordinate permutations, non-linear and iteratively computed functions. One or more of the megafunctions can be also be configured to implement a process including multiplication of matrices by vectors, scalar product of vectors, and/or interleaving; and/or implement a process of decoding convolution codes. One or more of the megafunctions can also be configured to implement a process of decoding turbo codes, implement a process of decoding low density parity check (LDPC) codes; and/or implement a process of decoding algebraic codes such as Reed-Solomon codes. One or more megafunctions can be configured to implement a process of equalization of the processed signals; a process of synchronizing the processed signals; and/or one that implements a process of MIMO processing of the signals. Finally, one or more of the megafunctions can be configurable so that at least one protocol implements a space-time coding/decoding function. The CPU can also operate the interconnection switches so that different megafunctions can be interconnected to implement the same algorithm at the different stages in order provide efficient allocation of resources for implementing the protocol; and/or at least one parameter of the least one parameterized megafunction is set by an on-line condition, wherein the same algorithm is implemented by the same megafunction with the parameter set by the on-line condition. It will be evident to those skilled in the art that the number of megafunctions is only limited by the number of protocols for which the chip architecture is designed.

In one embodiment three megafunctions blocks are provided for correspondingly implementing: reconfigurable matrix-vector computations, see for example, U.S. Provisional Patent Application Ser. No. 60/586,391, filed Jul. 8, 2004 and entitled Method and Architecture for Implementation of Reconfigurable Matrix-Vector Computations ; reconfigurable orthogonal transformations, see for example, U.S Provisional Application Ser. No. 60/586,389, filed Jul. 8, 2004 and entitled Method and Architecture for Implementation of Reconfigurable Orthogonal Transformations ; and implementing reconfigurable trellis coding, see for example, U.S. Provisional Application Ser. No. 60/586,353, filed Jul. 8, 2004 and entitled Method and Architecture for Implementation of Reconfigurable Trellis-Type Coding , all of which is incorporated by reference.

Other modifications include configuring the clock as a variable clock applied to different megafunctions and configured to allow parallel processing of data at different clocking rates. The CPU can be configured so that it includes a processor configured to implement higher layer protocols; and enabling the clock so that a periodic enabling signal can be applied to different ones of the megafunctions.

In another preferred the chip architecture include a controller for operating the plurality of switches so that different megafunctions can be interconnected to implement the same algorithm at the different stages in order provide efficient allocation of resources for implementing the protocol. At least one of the megafunctions can be parameterized, and at least one parameter of the least one megafunction is set by an on-line condition, wherein the same algorithm is implemented by the same megafunction with the parameter set by the on-line condition.

In another embodiment a chip architecture is design for use in processing signals encoded in accordance with any one of a plurality of communication protocols each defined by a series of algorithms. The chip architecture comprises: an input/output for receiving input data and providing output processed data; memory for storing instructions relating to the configuration of the chip for each of the protocols; a plurality of megafunctions configured to be interconnected in each of plurality of configurations, at least one configuration corresponding to each of the communication protocols; a plurality of switches configured and responsive to control signals so as to interconnect the megafunctions in each of the plurality of configurations as determined by the communication protocol of the encoded signals; a reconfigurable net bus for interconnecting the switches, megafunctions and input/output; and a CPU configured to control the configuration of the megafunctions, switches and buses as a function of the communication protocol of the encoded signals. Further, at least some of the megafunctions can include reconfigurable parameters, and the CPU can be configured to control the configuration of the megafunctions, switches and net bus including dynamic control of the reconfigurable parameters. The memory can include RAM configured to store compiled software instructions. The architecture can further include a variable clock applied to different megafunctions and configured to allow parallel processing of data at different clocking rates. The CPU can include a processor configured to implement higher layer protocols. The architecture can further include an enabler for applying a periodic enabling signal to different ones of the megafunctions.

The chip architecture has many uses including in a wireless communication device for use in processing signals encoded in accordance with any one of a plurality of communication protocols each defined by a series of algorithms. The wireless communication device preferably comprises: an antenna for receiving and transmitting a signal encoded in accordance with anyone of a plurality of communication protocols; a baseband processor for processing the signals received and transmitted by the antenna; configware comprising: a plurality of megafunctions, each in the form of reusable, reconfigurable functional blocks for use in implementing different algorithms necessary for implementing the physical layer of each of the communication protocols; and a plurality of switches configured to respond to select control signals so as to interconnect the necessary megafunctions for processing the signals encoded with each of the protocols. At least some of the same megafunctions are used with algorithms of two or more protocols. The wireless device can include a transmitter, and the baseband processor encodes the processed signal in accordance with any one of said protocols prior to transmitting the signal, or a receiver, and the baseband processor decodes the processed signal in accordance with any one of said protocols after receiving the processed signal, or both.

Finally, another aspect of the disclosure relates to a method of manufacturing a chip with an architecture for use in processing signals encoded in accordance with any one of a plurality of communication protocols each defined by a series of algorithms. The method comprises creating configware so as to include a plurality of megafunctions, each in the form of reusable, reconfigurable functional blocks for use in implementing different algorithms necessary for implementing the physical layer of each of the communication protocols; and a plurality of switches configured to respond to select control signals so as to interconnect the necessary megafunctions for processing the signals encoded with each of the protocols; wherein at least some of the same megafunctions are used with algorithms of two or more protocols.

GENERAL DESCRIPTION OF THE DRAWINGS

Reference is made to the attached drawings, wherein elements having the same reference character designations represent like elements throughout, and wherein.

DETAILED DESCRIPTION OF THE DRAWINGS

For some signal processing applications, and in particular the execution of signals in accordance with the various known communication protocols, alternative approaches can typically exhibit high degrees of parallelism and are dominated by a few regular kernels of computation that are responsible for a large portion of execution time and energy. For these applications, one could potentially achieve significant power savings by executing the dominant computational kernels of a given class or domain of applications with common features on dedicated, optimized processing elements with minimum energy overhead. Those domains of applications that unite into bigger optimized processing domains are hereinafter called "megafunctions".

The term "megafunction" has been used in Electronic Design Automation (EDA) to designate "plug-in" or "off-the-shelf functional blocks" that are inserted into a larger electronic design, and connected together resulting in a particular software program design. The resulting software program design includes the off-the-shelf functional blocks integrated with other components of the design in a complied form. This design can be used to program a programmable logic device or layout an ASIC, for example. Such predefined off-the-shelf functional blocks are given various names in the EDA industry. Examples include megafunctions, cores, macrofunctions, and the like. See U.S. Pat. No. 6,401,230. By contrast, in the present disclosure, the term "megafunction" is used to describe reusable functional blocks created as configware, and which can be adaptively reconfigured to implement different (in parameters as well as in nature) algorithms necessary for the implementation of the physical layer of anyone of a plurality of communication protocols. As a result signals processed in accordance with any one of the protocols can be processed with the same system architecture. Megafunctions in the present disclosure are not used in a software program design, wherein all parameters are fixed once and forever. In the present disclosure, the megafunctions (as well as other functional blocks of the architecture), the interconnections between and among the megafunctions (and the other functional blocks), and if necessary the parameters of one or more megafunctions can be reconfigured as a function of the particular communication protocol.

The result is a domain-specific processor whose design involves trading off the flexibility of a general-purpose programmable device to achieve higher levels of energy efficiency, while maintaining the flexibility to handle a variety of algorithms within the domain of interest. Other processors are designed to exam the basic idea of implemented domains in hardware, such as the Berkeley Pleiades architecture based on this approach (see, for example, A. Abnous and J. Rabaey, "Ultra-Low-Power Domain-Specific Multimedia Processors," *Proceedings of the IEEE VLSI Signal Processing Workshop*, San Francisco, October 1996), but with an essentially smaller granularity of the functions, and therefore are less efficient.

In accordance with the disclosure, therefore advantages are obtained if those device components having identical functionality are united into a new common device for cost savings, improved power consumption efficiency and space considerations. When using multiple applications using computationally intensive complex algorithms one needs to take into consideration the implementation technique of each such application.

Thus, when designing a system for executing complex algorithms representing certain functions associated with two or more applications, whether the applications are competing or independent of one another, the following basic principles are necessarily considered in order to optimize, and make the most efficient system:

1. The functions in all of the applications need to be treated and implemented as one and the same function. If this cannot be achieved, then they must be implemented with the minimum of functions as possible.
2. The application functions must be of the type that are capable of being re-defined, i.e., reconfigurable.
3. The device optimization does not require the functions to be implemented in a System on a Chip (SOC) module since the functions of the application that are capable of being reconfigured are large enough to be implemented outside the main SOC.

The preferred solution according to the teachings of this disclosure is as follows:

1. Complex functions of two or more applications need to be implemented as megafunctions i.e., the whole domain of large functions for each application needs to be implemented in hardware and not only the most basic arithmetical components as DSP vendors currently implement. For example, fast Fourier transform (FFT) and Viterbi algorithms are implemented in modern digital signal processing using accelerator blocks. For the FFT case the basic butterfly function is implemented in hardware, as well as for the Viterbi algorithm the basic Add-Compare-Select function is implemented in hardware. Also in the case of the Berkeley Pleiades architecture the granularity is too small to use hardware. Megafunction implementation reaches the same ability for those functions as in ASIC implementation, while each megafunction purpose can be changed and configured as in regular DSP's or CPU's functionality.
2. The megafunction ability of reconfigurable functionality is achieved by the use of very complex functions (megafunctions), which can be broken down to those basic complex functions. Since these megafunctions are huge, the optimization benefit is substantially more significant than one can achieve over implementation of each function separately. Furthermore, the megafunction optimization benefit is to rely on using unique mathematical properties that exist in the core of the complex functions that can be implemented differently and more efficiently for large quantities.
3. All the megafunctions need to be connected to a programmable bus net so most of the application functions can be implemented as one function.

In order to implement an integrated chip (IC) with the above-mentioned solution, the chip architecture preferably includes the following:

1. A controlling block configured to control the functions of all the other blocks, for example: the configware structure;
2. An I/O block configured to receive pre-processed data, deliver processed data out and determine the DSP required functionality;
3. Megafunctions that define the algorithmic functionality that should be embedded in configware.

Figure 1:
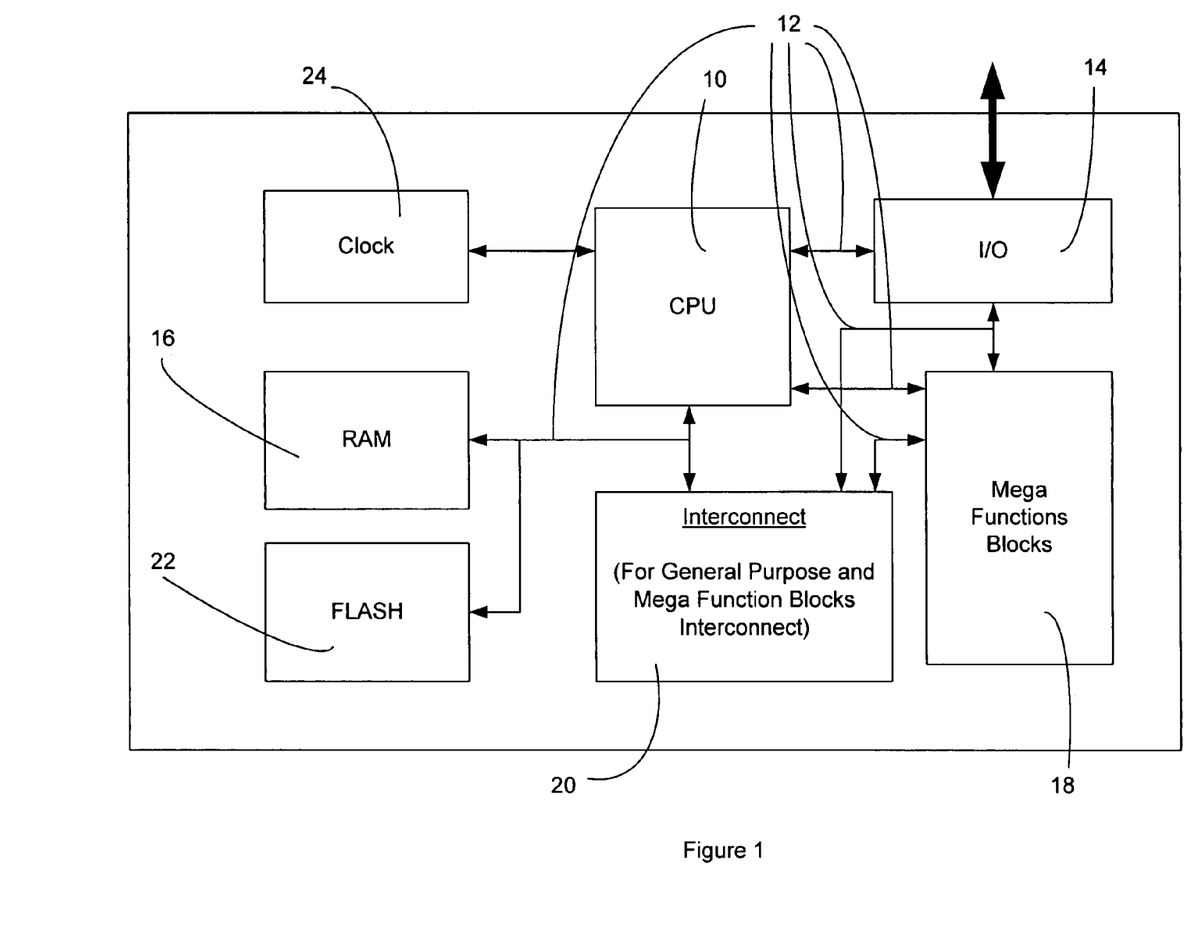
FIG. 1 is a block diagram of one chip architecture designed in accordance with the disclosed teachings.

Accordingly, as illustrated in FIG. 1, an embodiment of an integrated chip made to comply with the foregoing chip architecture requirements will comprise the following basic functional components:

CPU 10 is preferably a relatively small computer processing unit needed for (a) controlling the configware part of the device i.e., net bus12, I/O block 14, RAM block 16, megafunction block(s) 18, interconnect block 20, flash memory block 22, and clock 24; and (b) fixing the configuration of the megafunctions block(s) 18, as well as the bus 12, I/O block 14, RAM block 16, interconnect block 20, flash memory block 22 and clock 24, depending upon the protocol of the signals be processed by the chip. CPU 10 can also help by computing minor and simple assignments or tasks, and configuring the bus that is used to interconnect the megafunctions and the I/O block.

The net bus 12 is reconfigurable depending on the protocol. I/O block 14 is preferably a configurable I/O block that connects the chip with the outside world. Its tasks include receiving the "compiled software" of the application algorithm, and receiving input data and delivering output-processed data. RAM 16 is a random access memory preferably configured to store the "compiled software instructions", and to cache and buffer data. Megafunctions block 18 is preferably configured to include the major application functions of two or more applications, i.e., protocols, which are processed by computing each domain of the application functions as one function with extraordinary efficiency. Interconnect block 20 preferably includes the reconfigurable net bus, which connects all the components of the chip including the CPU 10, I/O block 14, RAM 16, Megafunctions block 18, and Flash Memory 22 and Clock block 24. The interconnect block can also be configured to perform minor and simple assignments or tasks, preferably in extra memory. Finally, flash memory 20 preferably serves to store data as the chip runs through its programs. Flash memory is preferably in the form of EEPROM that allows multiple memory locations to be erased or written in one programming operation, so that it can operate at higher effective speeds when the systems using it read and write to different locations at the same time. It should be appreciated that for less complex operations, other types of memory could be used. Information is preferably stored in the flash memory by storing the information on a silicon chip in a way that does not need power to maintain the information in the chip. Consequently, power to the chip can be withdrawn and the information retained in flash memory without consuming any power. In addition, flash memory offers fast read access times and solid-state shock resistance, making flash memory particularly desirable in applications such as data storage on battery-powered devices like cellular phones and PDAs.

Figure 2:
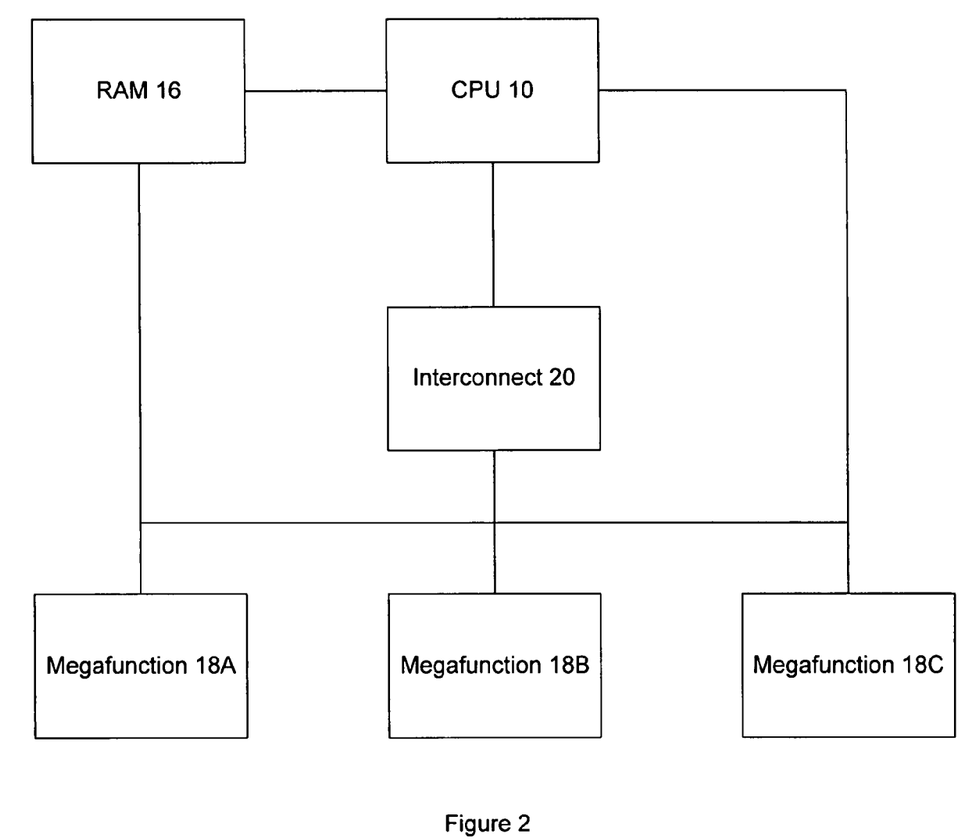
FIG. 2 is a block diagram of the megafunction and interconnect blocks of a chip architecture designed in accordance with the disclosed teachings.

The interaction among the CPU 10, RAM 16, Megafunctions block(s) 18, Interconnect block 20 is illustrated in FIG. 2. As shown the architecture is capable of processing signals encoded in accordance with any one of a plurality of communication protocols each defined by a series of algorithms. A plurality of megafunctions are provided as configware, each in the form of reusable, reconfigurable functional blocks 18A, 18B, 18C for implementing different algorithms necessary for implementing the physical layer of each of the communication protocols processed by the system. The interconnect block 20 includes a plurality of switches configured to respond to select control signals (indicative the protocol of the signals to be processed) from the CPU 10 so as to interconnect the necessary megafunctions 18 for processing the signals encoded with each of the protocols. While three megafunctions are illustrated in FIG. 2, it should be appreciated that any number of megafunctions can be used. The configuration of the blocks 18 is controlled by signals received from RAM 16 as a function of the protocol of the signals being processed. Preferably, at least some of the same megafunctions are used with algorithms of two or more protocols.

In one embodiment at least some of the megafunctions are parameterized, and the parameters of at least some of the megafunctions being adapted to be dynamically changed depending on the communication protocol. In another embodiment, the size of at least some of the buses 12 (shown in FIG. 1) are adapted to be dynamically changed depending on the communication protocol.

The control signals for changing parameters of the parameterized megafunctions, as well as a set of signals for reconfiguring the megafunctions as well as the interconnections of block 20 are preferably stored in memory, such as memory 16, or can be inserted on-line from outside the chip architecture through, for example, I/O block 14. The chip also includes an analyzer preferably made a part of the information stored in RAM 16 and run on CPU 10 is configured so as to determine the protocol of the signal processed by the chip architecture, and apply the necessary control signals so as to configure the switches and interconnect the necessary megafunctions for processing the signals according to the determined protocols. The analyzer can be, for example, an algorithm performed by the CPU 10 of the system architecture, an algorithm for checking the strength of the signals processed by the chip architecture, or simply responsive to the user input to the system architecture. The chip architecture thus includes some type of control for sensing the protocol of the signal, and operating the switches and configuring the megafunctions accordingly. The protocol used to process the signal can also be determined by a hand-off protocol between communication standards.

At least one protocol can implement the same algorithm at different stages of the protocol, as a function of a change in the receipt/transmission conditions with the megafunctions being configured accordingly. At least one protocol can also implement the same algorithm at different megafunctions of the same stage of the protocol as a function of a change in the receipt/transmission conditions. One or more of the megafunctions can be configured to implement any number of algorithms including: orthogonal transforms of the signals, such as cosine and sine transforms, Hilbert transforms and/or Walsh functions; algorithms involving Fourier transforms and/or Walsh-Hadamard transforms; those that perform processing of trellises defining the signals; algorithms that search for the minimum/maximum weight path, the BCJR algorithm for calculation of a MAP, and/or a belief propagation algorithm; and/or those that implement matrix-vector operations, including those which use finite and/or infinite fields and additional operations supported by the matrix-vector operations including polynomial convolutions, vector coordinate permutations, non-linear and iteratively computed functions. One or more of the megafunctions can be also be configured to implement a process including multiplication of matrices by vectors, scalar product of vectors, and/or interleaving; and/or implement a process of decoding convolution codes. One or more of the megafunctions can also be configured to implement a process of decoding turbo codes, implement a process of decoding low density parity check (LDPC) codes; and/or implement a process of decoding algebraic codes such as Reed-Solomon codes. One or more megafunctions can be configured to implement a process of equalization of the processed signals; a process of synchronizing the processed signals; and/or one that implements a process of MIMO processing of the signals. Finally, one or more of the megafunctions can be configurable so that at least one protocol implements a space-time coding/decoding function. The CPU can also operate the interconnection switches so that different megafunctions can be interconnected to implement the same algorithm at the different stages in order provide efficient allocation of resources for implementing the protocol; and/or at least one parameter of the least one parameterized megafunction is set by an on-line condition, wherein the same algorithm is implemented by the same megafunction with the parameter set by the on-line condition. It will be evident to those skilled in the art that the number of megafunctions is only limited by the number of protocols for which the chip architecture is designed.

In one embodiment three megafunctions blocks are provided for correspondingly implementing: reconfigurable matrix-vector computations, see for example, U.S. Provisional Patent Application Ser. No. 60/586,391, filed Jul. 8, 2004 and entitled Method and Architecture for Implementation of Reconfigurable Matrix-Vector Computations ; reconfigurable orthogonal transformations, see for example, U.S. Provisional Application Ser. No. 60/586,389, filed Jul. 8, 2004 and entitled Method and Architecture for Implementation of Reconfigurable Orthogonal Transformations ; and implementing reconfigurable trellis coding, see for example, U.S. Provisional Application Ser. No. 60/586,353, filed Jul. 8, 2004 and entitled Method and Architecture for Implementation of Reconfigurable Trellis-Type Coding , all of which is incorporated by reference.

Other modifications include configuring the clock 24 as a variable clock applied to different megafunctions and configured to allow parallel processing of data at different clocking rates. The CPU can be configured so that it includes a processor configured to implement higher layer protocols; and enabling the clock so that a periodic enabling signal can be applied to different ones of the megafunctions.

One application of the foregoing relates to wireless communication devices, such as PDAs, cellphones and the like, including handsets such as those used for ubiquitous roaming or those 3G -WLAN enabled, extension cards for laptop/tablet PCs. The architecture can also be provided as an all-purpose modem card, using for example, PCMCIA or Mini PCI Express Interfaces. The device can be incorporated into laptop/tablet PC motherboard, enabling built-in wireless connectivity with a variety of communication networks, lowering production costs, e.g., reducing motherboard chip count, inventory, number of product derivatives, and provide a free additional interface port (PCMCIA, USB) for the user.

Figure 3:
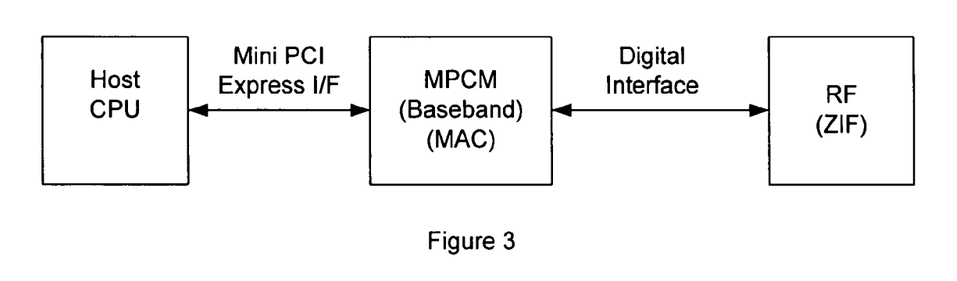
FIGS. 3-5 are respectively block diagrams applications of the disclosed chip architecture to a wireless communication device.
Figure 4:
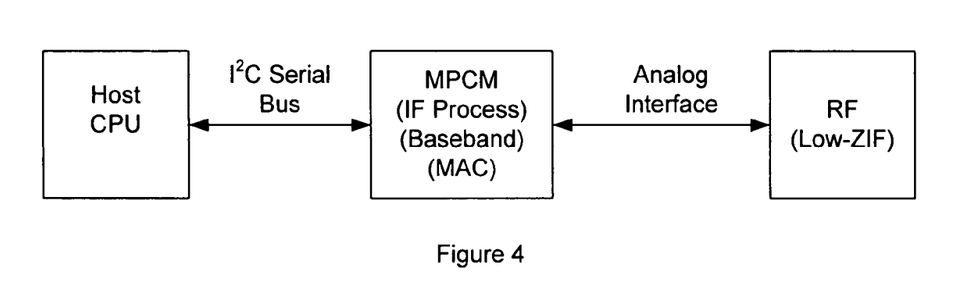
Figure 5:
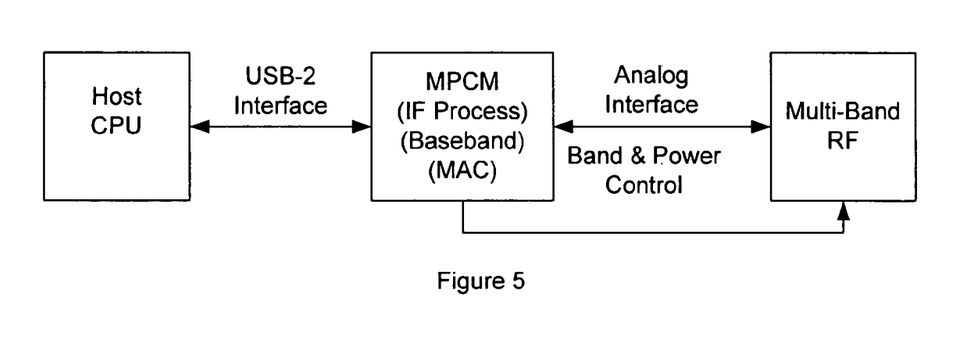

In the most basic configuration, the reconfigurable chip (described as a multi-purpose configurable modem or MPCM) having the type of reconfigurable architecture with megafunction blocks as described herein is provided in the form of configware and connected between the Host CPU and RF/Antenna module, as illustrated in the three embodiments shown in FIGS. 3-5. As shown, the MPCM indicated at 30 can operate either as a Baseband module (seen in FIG. 3), or as both Baseband and Low-IF module (Analog Baseband) (seen in FIG. 4), according to the RF module in use. Further the MPCM can be employed in single band and multiband systems (the former shown in FIGS. 3 and 4, while the latter is shown in FIG. 5).

In applications using several bands/types of RF modules, RF switches are used between the MPCM chip and the RF modules.

A MPCM having the reconfigurable architecture of the type described offers a single chip baseband modem solution for "multi-mode" wireless devices. The appropriate protocol stacks can run, for example, on an ARM-8 or -9 Processor. By using the three major mathematical transformations, or megafunctions mentioned above, i.e., (1) reconfigurable matrix-vector computations, (2) reconfigurable orthogonal transformations; and (3) reconfigurable trellis processing with a configured data-path supporting any given set of communication algorithms, the architecture allows the MPCM to adapt effectively to any application running on any wireless terminal at any given time while accessing any given wireless network, such as Cellular/WWAN or a Wireless LAN. By providing the MPCM as proposed the chip architecture allows for transformation of the chip from a Cellular GSM/GPRS baseband/protocol stack chip to a W-CDMA chip, Wi-MAX or a WLAN Wi-Fi chip "on-demand" wherein new algorithms can be accommodated on-chip in real time via different control sets.

A MPCM can be provided which supports audio requirements such as voice codecs, acoustic echo cancellation, noise suppression, and voice activity detection, employing MPCM internal resources.

The on-chip CPU 10 can serve as an application processor as well, for usage in low-end products.

The MPCM can function as a specific Cellular or a Wireless modem within the User's Terminal, be it a Handset or a Mobile Computing Device. The manufacturer of the wireless device can configure the MPCM at the production floor. Field or service station re-configuration to a different modem standard is optional. The MPCM can be a "pin-to-pin replacement" for current baseband designs.

The MPCM can re-configure itself dynamically according to the active Cellular/WWAN or Wireless LAN Network in the proximity of the user's terminal, be it a handset, a mobile computing device, or other wireless device.

The manufacturer can configure the MPCM at the production floor for a vertical roaming (handoff) mode of operation. In order to accommodate the above mentioned capabilities, the MPCM should be configured to support IEEE Vertical Handoff procedures to discover the nearest WLAN Access Point Network Standard or detect the nearest Cellular Base Station and identify the network type.

This enables capacity agreements between operators with different cellular networks. Customer identification (and single billing) can be done solely via terminal's SIM/USIM Card.

In both cases the terminal should have sufficient on-board system memory to accommodate protocol stacks for future standards and operating system support for MPCM code updates. Additional features and applications can include: (1) Baseband (Layer 1) and $3^{rd}$ Party Protocol Stacks (Layers 2&3) for all 2.5/2.75/3/3.5 G WWAN networks; (2) Heritage Networks support (TDMA, GSM, CDMA), Baseband and Protocol Stacks; (3) Baseband (Layer 1) and $3^{rd}$ Party Protocol Stacks (layers 2&3) for all WLAN networks; (4) concurrent handling of incoming 2G speech calls and data transfer via the nearest WLAN Access Point (Hot-spot); (5) support access discovery and establish communication channel with any Hot-spot, for example, a mobile IP-based vertical handoff of a wireless data call or a VOIP session between a WLAN network and a 3G network; (6) ensured session continuity (session interruption problems can be resolved by building intelligent elements end-to-end into existing networks to enable authentication and access discovery); (7) seamless transition from a hot-spot cell to carrier's 3G WWAN without having to re-boot a user's laptop or re-authenticate a session (a wireless LAN serving node (WSN) provides a link between the WLAN hot-spot network and the carrier's existing core network with home agent and AAA (Authentication, Authorization and Accounting) servers; (8) a vertical handoff system allows mobile users to seamlessly fall back to WWAN (cellular) networks such as GPRS or 3G whenever wireless LAN connectivity is not available; (9) the handoff mechanism allows a network connection on a mobile node to operate over multiple wireless access networks in a way that is completely transparent to end user applications; (10) global mobility ("anytime, anywhere" communications capability) via 3G-WLAN inter-working; and (11) public WLAN access service for 3GPP system subscribers by mobile operators, wherein the enabling functionalities include the reuse of 3GPP subscription, network selection, 3GPP system-based authentication, authorization and security key agreement using SIM/USIM card, user data routing and service access, as well as end user charging.

The advantages are provided by MPCM with the chip architecture described and claimed herein: power consumption per application is par or close to par to dedicated solutions; there is one terminal for all data & voice access; fast adaptation is provided to changing communication standards-no terminals recall; allows simple re-configuration of future or yet-to-be-defined standards and protocols in the field; help consolidate product lines, decrease development costs, improve inventory handling; reduces overall BOM costs in multi-access/multi-mode/multi-band terminals; programmable RF Interface to match off-the-shelf RF modules and chipsets; and/or I/Q modulator/demodulator can be included in the chip for analog interface with the RF unit.

The benefits of a multi-function baseband would be most evident if it were also coupled with a multi-function reconfigurable radio solution. (Coupled with a multi mode antenna).

The chip architecture can enable technology roaming between the communication networks, such as the following:

| | |
|---|---|
| WLAN | 802.11 a/b/g, 802.16 a/e, 802.20 |
| 2nd Generation wireless | GSM, CDMA, TDMA |
| 2.5 Generation | GPRS, 1xRTT |
| 2.75 Generation | EDGE/CDMA 2000 (1xEV-DO) |
| 3rd Generation | CDMA (1xEV-DV)/TD-SCDMA/UMTS (WCDMA) |
| 3.5 Generation | UMTS (HSDPA features) |

Power savings mechanism is an inherent feature of the megafunction operation. Low power monitoring algorithms can be set for power saving when only channel monitoring is needed. The CPU 10 can serve as an application processor as well, for a true single processor solution. The qualified protocol stacks are already compiled, run and verified on the CPU. Having a well-defined interface with Layer 1, makes updating a protocol stack version a simple task.

Comparing a chip designed in accordance with the foregoing architecture with FPGA-core, DSP, SOC, and ASIC designs, the following can be observed:

1. ASIC & SOC designs are cost effective for large quantities, and can deal with large volumes of data, but generally do not provide re-configurable ability, and designing from scratch is extensive.
2. DSP and CPU designs—suitable to deal with narrow-band data usage, and provides a high re-configurability. Further, designing an implementation from scratch can be very fast, but typically is not cost effective.
3. FPGA is relatively expensive, can deal with large volumes of data, re-configurable ability, designing is lengthy.

The architecture methodology suggested in this disclosure and shown in FIG. 1, resembles in size, performance and power consumption of an ASIC, while still maintaining the adaptation, flexibility and time to market of DSP/CPU software solutions.

The improved performance of the chip designed in accordance with the teachings of the present disclosure is demonstrated in the following example. The example which is shown here references two tables of performance from Berkeley Wireless Research Center, EECS

TABLE 1

Different Architecture Implementation of LMS for MUD

| Architecture | Power (mW) | Area (mm$^2$) |
|---|---|---|
| TMS320C54x | 460 | 1089 |
| Data-flow Driven Satellites | 18.04 | 5.07 |
| ASIC | 3 [15] | 1.5 |

Department with theirs Pleiades architecture compared to other architectures.

Table 1 shows that ASIC architectures are within the order of 726 times smaller in area size and consume 153 times less power than standard DSP chips, without adequate accelerator functionality instructions. Furthermore, Berkeley Pleiades architecture compared to ASIC gives that ASIC 3.3 times sufficient in area size and 6 times sufficient in power consumption then Pleiades architecture. Pleiades architecture is similar in performance to those of dedicated DSP adequate accelerator functionality instructions. In addition, Pleiades architectures have granularity smaller then the megafunctions, hence are less effective architectures. Furthermore, the overall efficiency of the megafunctions is much closer to those of ASIC which shows that ASOCS architecture performance is in a factor of above 20 comparing to DSP.

TABLE 2

Comparisons of Two Architectures for VSELP Kernels

|  | Energy on ARM8 (2.5 V) | Energy on Data-Driven Reconfigurable Architecture (1 V) |
| --- | --- | --- |
| Dot_product | 11550 µJ | 153.7 µJ |
| FIR | 5690 µJ | 96.10 µJ |
| VectorSumScalarMul | 4800 µJ | 23.95 µJ |
| Compute_Code | 1550 µJ | 2.195 µJ |
| IIR | 390 µJ | 1.200 µJ |

Table 2 shows comparison between ARM8 CPU and Berkeley Pleiades architecture in power consumption for different algorithms each algorithm has its own amount of MIPS needed so the factor difference in energy consumption is indicated in the efficiency difference between them. Again, it is important to remember that the Pleiades architecture, due to its smaller granularity is less effective than megafunctions architecture.

Thus, a new and improved chip architecture constructed in accordance with the present disclosure, and some applications for the chip architecture, have been described. The exemplary embodiment described in this specification have been presented by way of illustration rather than limitation, and various modifications, combinations and substitutions may be effected by those skilled in the art without departure either in spirit or scope from this disclosure in its broader aspects and as set forth in the appended claims. For example, while the architecture is described as a single chip solution, it is possible that the functions provided by such a chip can be provided by more than one chip, or a chip set.

The chip architecture of the present disclosure as disclosed herein, and all elements thereof, are contained within the scope of at least one of the following claims. No elements of the presently disclosed chip arch are meant to be disclaimed, nor are they intended to necessarily restrict the interpretation of the claims.

What is claimed is:

1. A chip arrangement for use in processing communication signals with a battery-operated communication device having limited power available for the chip arrangement, the communication signals being processed in accordance with any one of a plurality of selected communication protocols, each protocol being defined by a different set of algorithms necessary for the implementation of that communication protocol, the chip arrangement comprising:

all of the algorithms necessary to implement all of the selected communication protocols, at least some of the algorithms being partitioned into subsets, at least some of the subsets each define a domain of similar algorithms used by more than one of the communication protocols, wherein the domains associated with each communication protocol are arranged so that they can be implemented in a manner so as to define a set of megafunctions for each of the communication protocols, the megafunctions comprising a plurality of reusable, reconfigurable, functional blocks configured so as to implement the physical layer of the corresponding selected communication protocol;

a plurality of switches configured to respond to select control signals as a function of a selected communication protocol so as to interconnect the necessary blocks of the megafunctions for processing the communication signals as a function of the selected communication protocol;

buses interconnecting the megafunctions;

an interconnect network, and memory for storing a set of signals for configuring the appropriate megafunctions and the interconnect network between the appropriate megafunctions so as to set the algorithms and any parameters associated with the selected communication protocol; and an analyzer configured so as to determine the communication protocol of the signal processed by the chip architecture, and apply the necessary control signals so as to automatically configure the switches and interconnect the necessary megafunctions for processing the communication signals according to the determined protocol, wherein the protocol for processing of the communication signals is determined by a hand-off protocol between communication standards;

wherein appropriate ones of the control signals are generated in response to a determination of the communication protocol of the processed signals so that the chip arrangement is configured in a predetermined fixed arrangement of megafunctions such that the communication signals can be processed in accordance with the correct communication protocol without further reconfiguration of the chip arrangement so as to conserve power consumption while processing the communication signals in accordance with the correct communication protocol with the limited available power;

wherein at least some of the megafunctions are parameterized, the parameters of at least some of the parameterized megafunctions are adapted to be dynamically changed as a function of the selected communication protocol in response to a determination of the communication protocol of the processed signals; and wherein the size of at least one of the buses is adapted to be configured upon determination of the communication protocol of the processed signals.

2. The chip arrangement according to claim 1, further including memory, wherein the control signals for changing parameters of the parameterized megafunctions are stored in the memory, and the appropriate ones of the control signals are automatically generated in response to a determination of the communication protocol of the processed signals so that the chip arrangement automatically processes those communication signals in accordance with the correct communication protocol.

3. The chip arrangement according to claim 1, wherein the control signals for changing the parameters of the parameterized megafunctions are inserted on-line from outside the chip architecture.

4. The chip arrangement according to claim 1, further including memory, wherein the control signals are stored in the memory, and the appropriate ones of the control signals are automatically generated in response to a determination of the communication protocol of the processed signals so that the chip arrangement automatically processes those communication signals in accordance with the correct communication protocol without further reconfiguring the chip arrangement.

5. The chip arrangement according to claim 1, wherein the control signals are inserted on-line from outside the chip architecture.

6. The chip arrangement according to claim 1, wherein the chip arrangement includes a system architecture, and the analyzer includes an algorithm performed by the system architecture.

7. The chip arrangement according to claim 6, wherein the analyzer includes an algorithm for checking the strength of the communication signals processed by the chip architecture.

8. The chip arrangement according to claim 1 wherein the analyzer includes an algorithm for checking the strength of the communication signals processed by the chip architecture.

9. The chip arrangement according to claim 1, further including a control for sensing the protocol of the communication signal, and responsively operating the switches and configuring the megafunctions accordingly.

10. The chip arrangement according to claim 1, wherein at least one protocol requires the implementation of the same algorithm at different stages of the protocol, as a function of a change in the receipt/transmission conditions.

11. The chip arrangement according to claim 1, wherein at least one protocol requires the implementation of the same algorithm at different megafunctions of the same stage of the protocol as a function of a change in the receipt/transmission conditions.

12. A chip arrangement for use in processing communication signals in a battery-operated modem having limited power available for the chip, wherein the communication signals are processed in accordance with any one of a plurality of selected communication protocols, each communication protocol being defined by a different set of algorithms necessary for the implementation of that communication protocol, the chip arrangement comprising:

all of the algorithms necessary to implement the plurality of selected communication protocols, at least some of the algorithms being partitioned into subsets, at least some of the subsets each define a domain of similar algorithms used by more than one of the selected communication protocols, wherein the domains associated with each communication protocol are arranged so that they can be implemented in a manner so as to define a set of megafunctions comprising a plurality of functional blocks configured to implement the physical layer of the corresponding selected communication protocol;

a plurality of switches configured to respond to select control signals as a function of the selected communication protocol so as to selectively interconnect the necessary blocks of the megafunctions for processing the communication signals as a function of the selected communication protocol;

buses interconnecting the megafunctions;

an interconnect network, and memory for storing a set of signals for configuring the appropriate megafunctions and the interconnect network between the appropriate megafunctions so as to set the algorithms and any parameters associated with the selected communication protocol; and an analyzer configured so as to determine the communication protocol of the signal processed by the chip architecture, and apply the necessary control signals so as to automatically configure the switches and interconnect the necessary megafunctions for processing the communication signals according to the determined protocol, wherein the protocol for processing of the communication signals is determined by a hand-off protocol between communication standards ;memory for storing control signals applied to the switches as a function of the communication protocol of the communication signals to be processed so that the modem can configure the chip to process communication signals in accordance with the correct communication protocol with the limited available power, without further reconfiguration of the chip during such process, so as to conserve power consumed by the chip wherein at least some of the megafunctions are parameterized, the parameters of at least some of the parameterized megafunctions are adapted to be dynamically changed as a function of the selected communication protocol in response to a determination of the communication protocol of the processed signals; and wherein the size of at least one of the buses is adapted to be configured upon determination of the communication protocol of the processed signals.

13. The chip arrangement according to claim 12, wherein one or more of the megafunctions is configured to implement algorithms involving orthogonal transforms of said communication signals.

14. The chip arrangement according to claim 12, wherein one or more of the megafunctions is configured to implement algorithms involving cosine and sine transforms.

15. The chip arrangement according to claim 12, wherein one or more of the megafunctions is configured to implement algorithms involving Hilbert transforms.

16. The chip arrangement according to claim 12, wherein one or more of the megafunctions is configured to implement algorithms involving Walsh functions.

17. The chip arrangement according to claim 12, wherein one or more of the megafunctions is configured to implement algorithms involving Fourier transforms.

18. The chip arrangement according to claim 12, wherein one or more of the megafunctions is configured to implement algorithms involving Walsh-Hadamard transforms.

19. The chip arrangement according to claim 12, wherein one or more of the megafunctions is configured to perform processing of trellises defining the communication signals.

20. The chip arrangement according to claim 12, wherein one or more of the megafunctions is configured to implement a search of the minimum/maximum weight path, the BCJR algorithm for calculation of a MAP, and a belief propagation algorithm.

21. The chip arrangement according to claim 12, wherein one or more of the megafunctions is configured to implement matrix-vector operations.

22. The chip arrangement according to claim 21, wherein one or more of the megafunctions is configured to implement matrix-vector operations in finite and/or infinite fields.

23. The chip arrangement according to claim 21, wherein one or more of the megafunctions is configured to implement additional operations supported by the matrix-vector operations including polynomial convolutions and vector coordinate permutations.

24. The chip arrangement according to claim 12, wherein at least one or more of the megafunctions is configured to implement a process including multiplication of matrices by vectors, scalar product of vectors, and interleaving.

25. The chip arrangement according to claim 12, wherein one or more of the megafunctions is configured to implement a process of decoding convolution codes.

26. The chip arrangement according to claim 12, wherein one or more of the megafunctions is configured to implement a process of decoding turbo codes.

27. The chip arrangement according to claim 12, wherein one or more of the megafunctions is configured to implement a process of decoding low density parity check (LDPC) codes.

28. The chip arrangement according to claim 12, wherein one or more of the megafunctions is configured to implement a process of decoding algebraic codes.

29. The chip arrangement according to claim 12, wherein the algebraic codes include Reed-Solomon codes.

30. The chip arrangement according to claim 12, wherein one or more of the megafunctions is configured to implement a process of equalization of the processed signals.

31. The chip arrangement according to claim 12, wherein one or more of the megafunctions is configured to implement a process of synchronizing the processed signals.

32. The chip arrangement according to claim 12, wherein at least one protocol implements a space-time coding/decoding function.

33. The chip arrangement according to claim 12, wherein one or more of the megafunctions is configured to implement a process of MIMO processing of the processed signals.

34. A chip arrangement for use in a modem, comprising:
controller for operating a plurality of switches so that at least some of the algorithms necessary to implement selected communication protocols can be partitioned into subsets, at least some of the subsets each define a domain of similar algorithms used by more than one of the communication protocols, wherein the domains associated with each communication protocol are arranged so that they can be implemented in response to control signals in a manner so as to define a set of megafunctions for each communication protocol, each set of megafunctions comprise a plurality of reusable, reconfigurable functional processing blocks configured to implement the physical layer of a corresponding selected communication protocol; wherein the switches are set by the controller so as to enable the necessary blocks of the megafunctions once the selected communication protocol is determined, without further reconfiguration of the megafunctions associated with processing the signals associated with the selected communication protocol so as to conserve the power consumed by the chip arrangement;
a plurality of switches configured to respond to select control signals as a function of the selected communication protocol so as to selectively interconnect the necessary blocks of the megafunctions for processing the communication signals as a function of the selected communication protocol;
buses interconnecting the megafunctions;
an interconnect network, and memory for storing a set of signals for configuring the appropriate megafunctions and the interconnect network between the appropriate megafunctions so as to set the algorithms and any parameters associated with the selected communication protocol; and
an analyzer configured so as to determine the communication protocol of the signal processed by the chip architecture, and apply the necessary control signals so as to automatically configure the switches and interconnect the necessary megafunctions for processing the communication signals according to the determined protocol, wherein the protocol for processing of the communication signals is determined by a hand-off protocol between communication standards;
wherein at least some of the megafunctions are parameterized, the parameters of at least some of the parameterized megafunctions are adapted to be dynamically changed as a function of the selected communication protocol in response to a determination of the communication protocol of the processed signals; and
wherein the size of at least one of the buses is adapted to be configured upon determination of the communication protocol of the processed signals.

35. The chip arrangement according to claim 34, wherein at least one of the megafunctions is parameterized, and at least one parameter of the least one megafunction is set by an on-line condition, wherein the same algorithm is implemented by the same megafunction with the parameter set by the on-line condition.

36. A chip arrangement for use in processing communication signals in a battery-operated modem having limited available power for the chip arrangement, the signals being processed in accordance with any one of a plurality of selected communication protocols each defined by a series of algorithms, comprising:
an input/output for receiving input data and providing output processed data;
a listing of all algorithms necessary to implement all of the selected communication protocols; at least some of the algorithms being partitioned into subsets, each subset defining a domain of similar algorithms used by more than one of the communication protocols, wherein the domains associated with each communication protocol are arranged so that they can be implemented in a manner so as to define a unique set of megafunctions comprising a unique plurality of reusable, reconfigurable functional blocks for each communication protocol, and configured to be used to implement the physical layer of the corresponding selected communication protocol;
memory for storing instructions relating to the configuration of the chip for each of the protocols;
a plurality of switches configured and responsive to control signals provided as a function of the instructions relating to the configuration of the chip so as to interconnect the blocks of the megafunctions in the configuration determined by the communication protocol of the communication signals;
a reconfigurable net bus for interconnecting the switches, megafunctions and input/output; and
a CPU configured to control the configuration of the megafunctions, switches and buses as a function of the communication protocol of the communication signals;
an analyzer configured so as to determine the communication protocol of the signal processed by the chip architecture, and apply the necessary control signals so as to automatically configure the switches and interconnect the necessary megafunctions for processing the communication signals according to the determined protocol, wherein the protocol for processing of the communication signals is determined by a hand-off protocol between communication standards ;wherein the chip can be configured as a function of the communication protocol without the need for further reconfiguration of the megafunctions in processing the communication signals of that communication protocol so as to conserve the portion of the limited available power consumed by the chip arrangement;
wherein at least some of the megafunctions are parameterized, the parameters of at least some of the parameterized megafunctions are adapted to be dynamically changed as a function of the selected communication protocol in response to a determination of the communication protocol of the processed signals; and wherein the size of at least one of the buses is adapted to be configured upon determination of the communication protocol of the processed signals.

37. The chip arrangement according to claim 36, wherein at least some of the similar megafunctions include reconfigurable parameters, and the CPU is configured to control the configuration of the megafunctions, switches and net bus including dynamic control of the reconfigurable parameters.

38. The chip arrangement according to claim 37, wherein the memory includes RAM configured to store compiled software instructions.

39. The chip arrangement according to claim 37, further including a variable clock applied to different megafunctions and configured to allow parallel processing of data at different clocking rates.

40. The chip arrangement according to claim 36, wherein the CPU includes a processor configured to implement higher layer protocols.

41. The chip arrangement according to claim 36, further including an enabler for applying a periodic enabling signal to different ones of the megafunctions.

42. A battery-operated, wireless communication device for use in processing communication signals processed in accordance with any one of a plurality of communication protocols each defined by a series of algorithms with limited available power, comprising:

an antenna for receiving and transmitting a communication signal processed in accordance with anyone of a plurality of communication protocols;

a baseband processor for processing the communication signals received and transmitted by the antenna; and configware comprising:

all of the algorithms necessary to implement all of the selected communication protocols, at least some of the algorithms being partitioned into subsets, each subset defining a domain of similar algorithms common to more than one of the communication protocols, wherein the domains associated with each communication protocol are arranged so that they can be implemented in a manner so as to define a set of megafunctions comprising a plurality of functional, reconfigurable, reusable blocks configured to implement the physical layer of the corresponding selected communication protocol; and a plurality of switches configured to respond to select control signals so as to interconnect the necessary blocks of the megafunctions for processing the communication signals according to any one of the protocols;

buses interconnecting the megafunctions;

an interconnect network, and memory for storing a set of signals for configuring the appropriate megafunctions and the interconnect network between the appropriate megafunctions so as to set the algorithms and any parameters associated with the selected communication protocol; and an analyzer configured so as to determine the communication protocol of the signal processed by the chip architecture, and apply the necessary control signals so as to automatically configure the switches and interconnect the necessary megafunctions for processing the communication signals according to the determined protocol, wherein the protocol for processing of the communication signals is determined by a hand-off protocol between communication standards;

wherein at least some of the megafunctions are parameterized, the parameters of at least some of the parameterized megafunctions are adapted to be dynamically changed as a function of the selected communication protocol in response to a determination of the communication protocol of the processed signals; and wherein the size of at least one of the buses is adapted to be configured upon determination of the communication protocol of the processed signals;

wherein appropriate ones of the control signals are generated in response to a determination of the communication protocol of the communication signals so that the modem processes those signals in accordance with the correct communication protocol without further need to reconfigure the modem so as to conserve battery power of the battery-operated, wireless communication device.

43. The wireless communication device according to claim 42, wherein the wireless device includes a transmitter, and the baseband processor encodes the processed signal in accordance with any one of said protocols prior to transmitting the signal.

44. The wireless communication device according to claim 42, wherein the wireless device includes a receiver, and the baseband processor decodes the processed signal in accordance with any one of said protocols after receiving the processed signal.

45. The wireless communication device according to claim 42, wherein the wireless device is adapted to transmit and receive, and the baseband processor is configured to encode the processed signal in accordance with any one of the protocols prior to transmitting an encoded signal, and decode the processed signal in accordance with any one of said protocols after receiving the processed signal.

* * * * *